Patented Apr. 24, 1923.

1,452,739

UNITED STATES PATENT OFFICE.

JOHN JAMES HOOD, OF LONDON, JOHN CLARK, OF HUTTON, AND PERCY GEORGE CLARK, OF LONDON, ENGLAND.

DECOLORIZING AND PURIFICATION OF SACCHARINE MATERIALS.

No Drawing.     Application filed November 4, 1919. Serial No. 335,618.

*To all whom it may concern:*

Be it known that we, JOHN JAMES HOOD, subject of the King of Great Britain, residing at 4, Canonbury Park north, London, England, JOHN CLARK, subject of the King of Great Britain, residing at Elsinore, Greenway, Hutton, Essex, England, and PERCY GEORGE CLARK, subject of the King of Great Britain, residing at 183, Oakwood Court, London, England, have invented new and useful Improvements in the Decolorizing and Purification of Saccharine Materials, of which the following is a specification.

The crude saccharine materials met with in commerce are generally of a deep yellow or brown color due to objectionable ingredients, and contain also certain mineral constituents such as salts of lime and traces of iron.

The object of our invention is to remove these colored constituents as well as a portion of the mineral salts present, and so obtain a purer material, producing more or less decolorized saccharine substances.

The crude materials which we treat may be colored solutions of raw cane or beet sugar in the natural state as expressed from the canes or roots; or the solutions may be prepared by dissolving these crude crystallized saccharine bodies in water; or we may employ artificially prepared glucose, such as is made by the action of acids or by other means from starchy materials, for example, maize or rice; or the crude solutions of dextrinous saccharine liquids, such as are prepared from malt.

According to this invention we effect the decolorizing and purifying of the saccharine materials by the employment of a product produced by the calcination or ignition of aluminum hydrate such as is met with in commerce generally as a trihydrate $Al_2O_3 3H_2O$. Or we may employ the nearest natural analogues, one or other of the various forms of bauxite, which are trihydrate of alumina containing small quantities of admixed ingredients, such as traces of silica titanic oxide or iron oxide, or trihydrate of alumina with a considerable admixture of silica which may be present up to as much as 30%.

These materials previous to use are ignited at dull redness whereby the water of constitution of the hydrate is driven off, forming aluminum oxid, $Al_2O_3$ and afterwards granulated to suitable size, or they may be first granulated before heating. Or we may introduce varying amounts of carbon or carbonaceous matters to the granulated natural or artificial materials before ignition to increase the efficiency of these filtering media.

The granulated and ignited substance is, when sufficiently cooled, placed in a suitable filtering vessel of convenient size which may be either stationary or capable of being turned round an axis for the purpose of discharging the contents and it may be supplied with a steam jacket in order to keep the filtering medium as well as the solution warm during the operation.

The saccharine solution which is to be purified or decolorized is allowed to percolate slowly through the filtering medium, the effluent may be collected in separate portions according to the amount of decolorization that has been effected and the solutions may be evaporated in the customary manner to obtain the crystallized saccharine body or only to the consistency of a syrup. With certain classes of saccharine substances we may find it advisable to add previous to filtering, small quantities of salts such as nitrate or chloride of alumina, or phosphate of lime, soda or the like to the saccharine solution to increase the decolorizing efficiency of the materials.

Instead of filtering the solution through the mass of purifying medium we may agitate the solution with the finely divided decolorizing material and subsequently filter off in the customary manner with filter presses.

When the efficiency of the filtering medium has become exhausted the adhering saccharine matters are washed out and the medium is discharged from the filter and ignited to a dull redness, air being excluded, and when sufficiently cooled it is replaced in the filter to be again employed in the manner already described.

After repeated alternate use and re-ignition, the decolorizing power of the ignited alumina or bauxite is greatly increased. The activity of the material continues to increase each time this revivifying operation is performed, until about the tenth ignition, when the bauxite or alumina becomes of a black color like ordinary char. The high decolorizing efficiency has now been developed, and is maintained until about the thirtieth ignition, when the material is found to contain an excessive quantity of carbon, and may be ignited in the presence of air to burn off a portion of the carbonaceous material, when the cycle of operations can be repeated many times.

What we claim is:—

1. The process of decolorizing saccharine liquid which comprises filtering it through ignited aluminum hydrate which has been cooled.

2. The process of decolorizing saccharine liquid which comprises filtering it through ignited aluminum hydrate which has been cooled, and thereafter igniting the filter material to revivify the same for further use.

3. The process of decolorizing saccharine liquid which comprises filtering it through ignited aluminum hydrate which has been cooled, and thereafter igniting the filter material in a vessel from which air has been excluded to revivify the same.

4. The process of decolorizing saccharine liquid which comprises filtering it through an ignited mixture of carbonaceous materials with aluminum hydrate which has been cooled.

5. The process of decolorizing saccharine liquid which comprises filtering it through ignited bauxite which has been cooled.

In testimony that we claim the foregoing as our invention we have signed our names this 17th day of October, 1919.

JOHN JAMES HOOD.
JOHN CLARK.
PERCY GEORGE CLARK.